Aug. 18, 1959  S. S. McINTYRE, SR  2,900,089
LOG YARDING AND LOADING APPARATUS

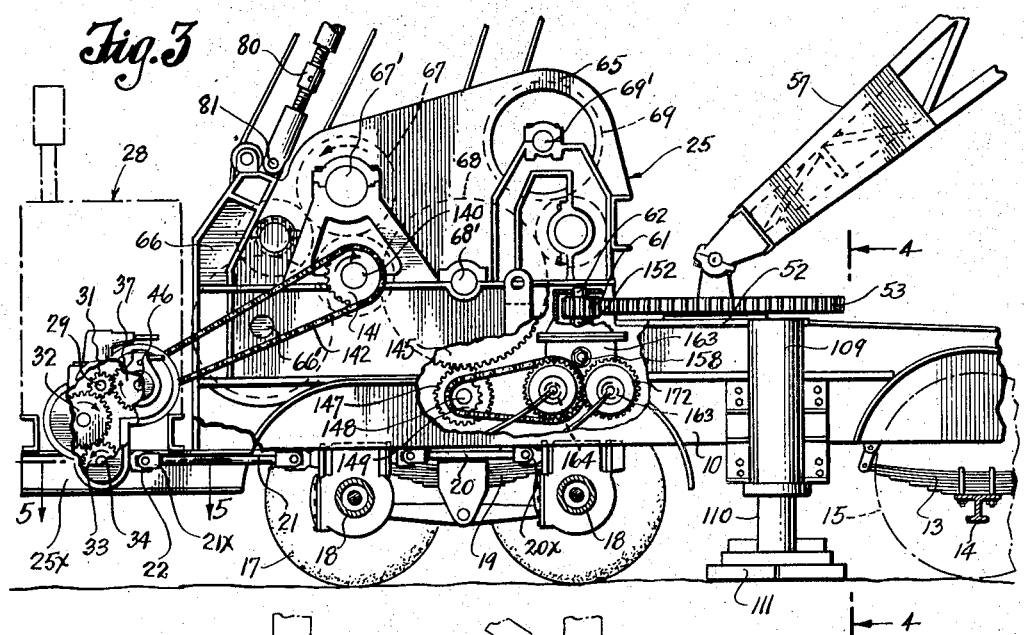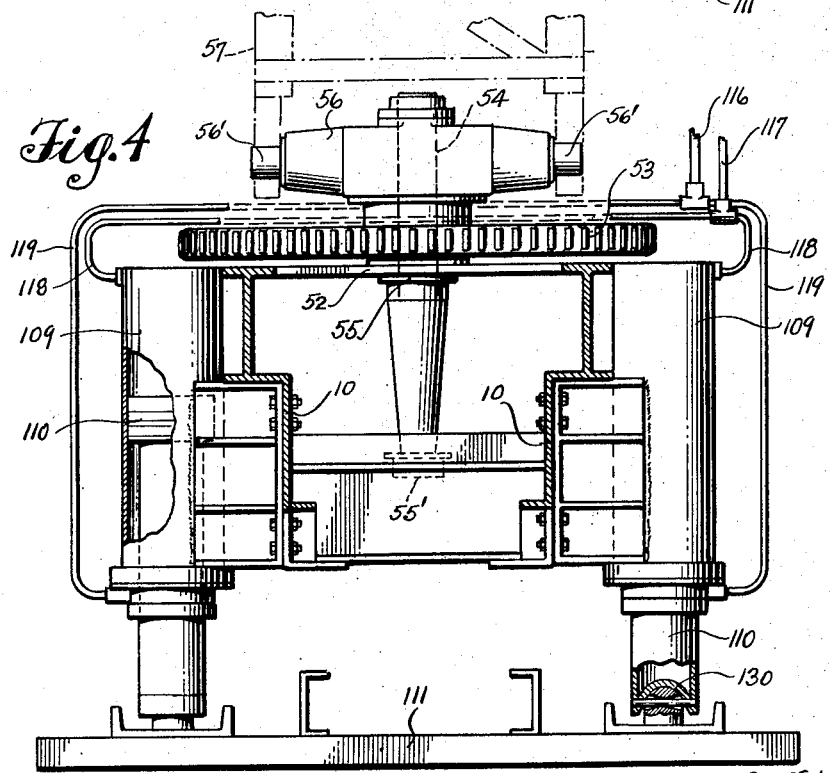

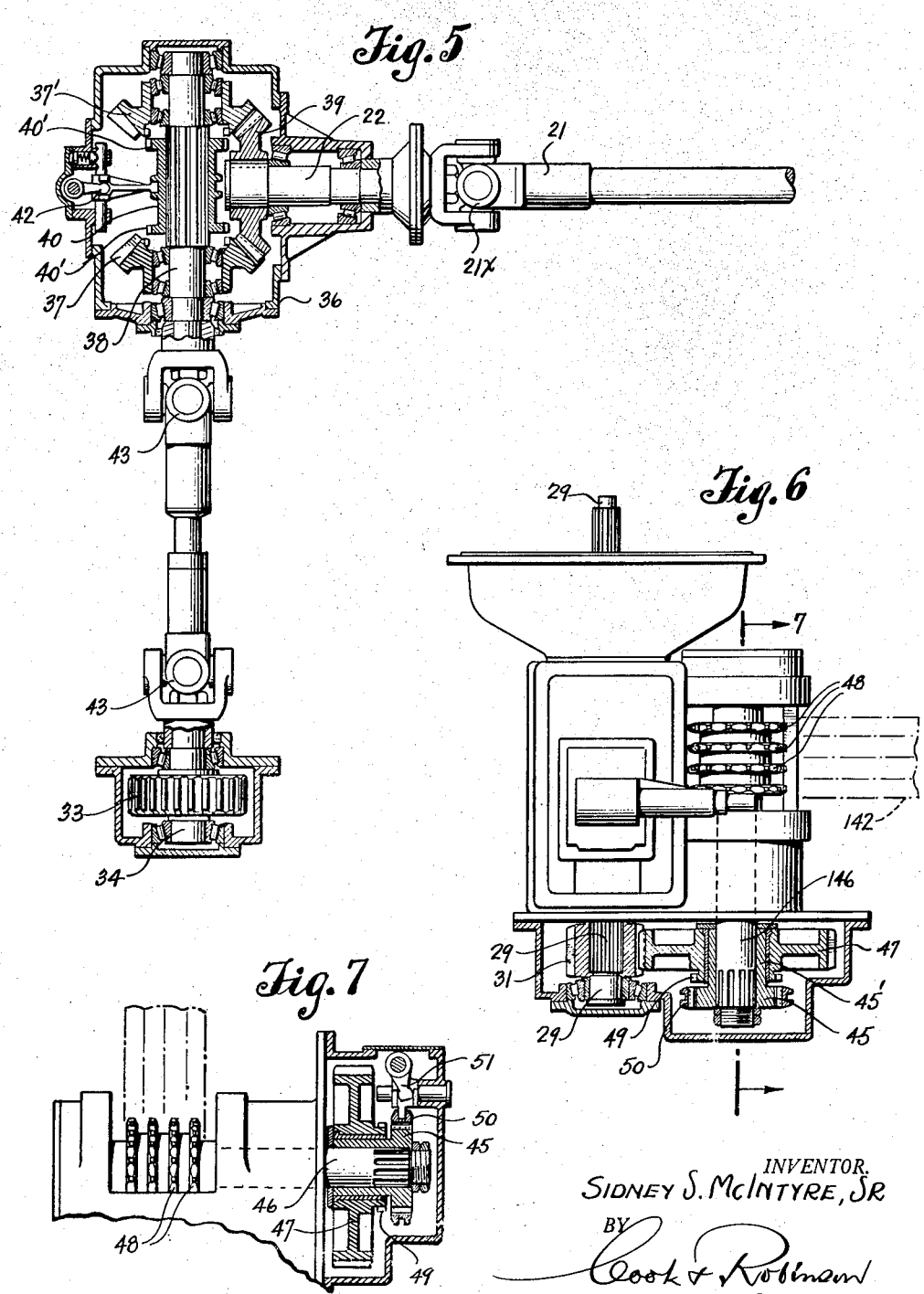

Original Filed July 2, 1951  7 Sheets-Sheet 5

INVENTOR.
SIDNEY S. McINTYRE SR
BY
Cook & Robinson
ATTORNEYS

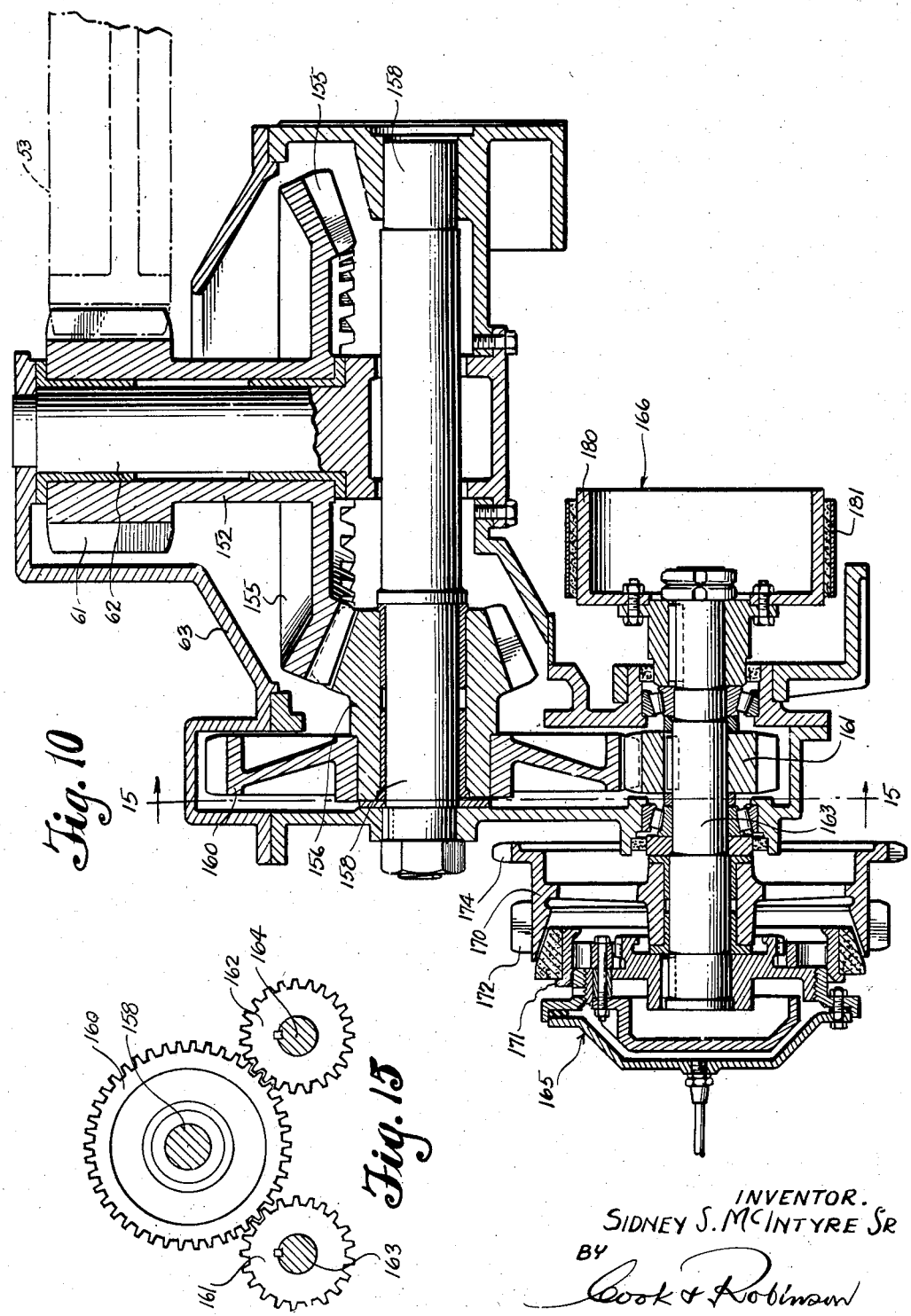

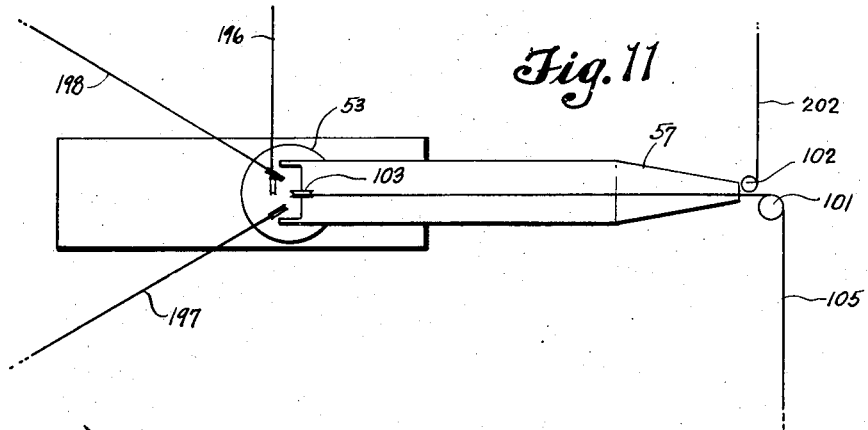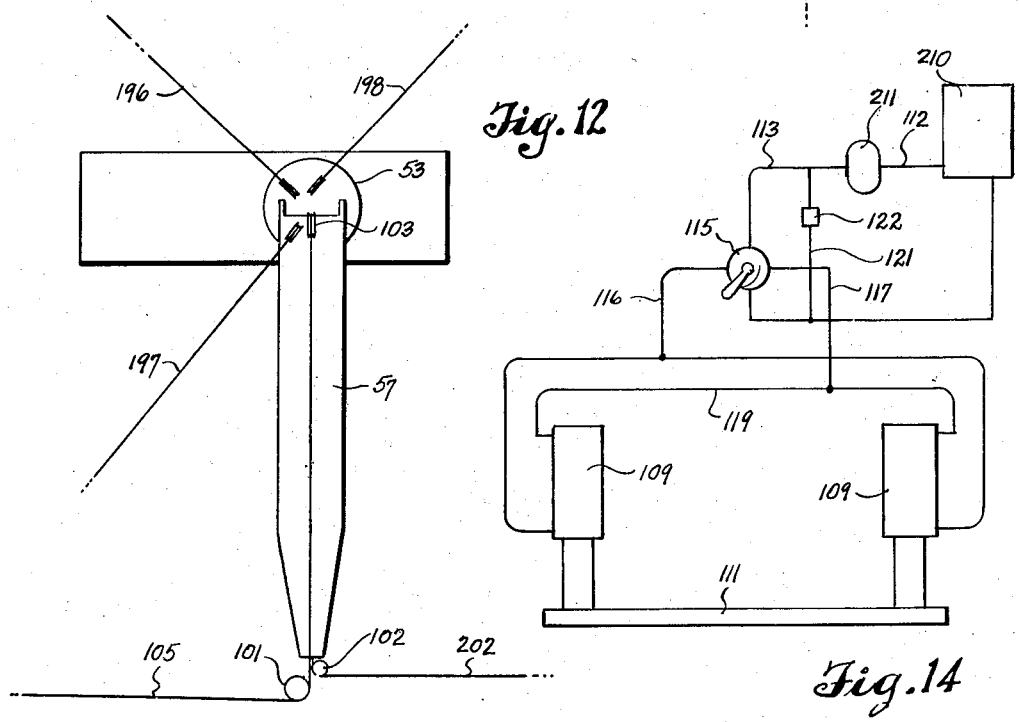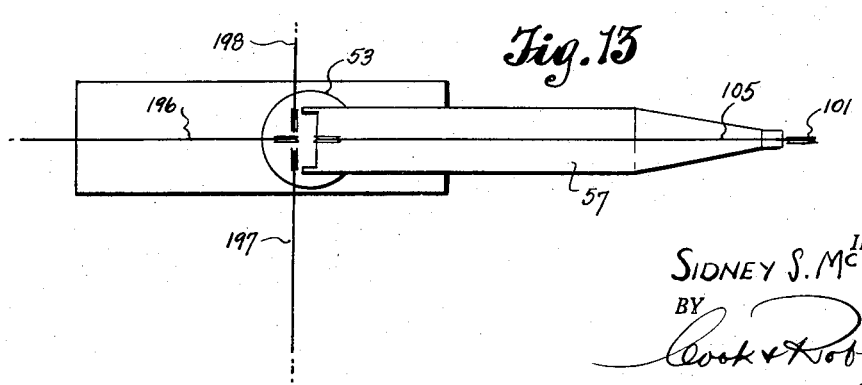

United States Patent Office 2,900,089
Patented Aug. 18, 1959

2,900,089

LOG YARDING AND LOADING APPARATUS

Sidney S. McIntyre, Sr., Sedro Woolley, Wash., assignor to The Humboldt Company, Seattle, Wash., a corporation of Washington Original application July 2, 1951, Serial No. 234,735, now Patent No. 2,745,559, dated May 15, 1956. Divided and this application January 3, 1956, Serial No. 556,927

2 Claims. (Cl. 212—59)

This invention relates to log handling machines. More particularly, it has reference to a combined log yarding and loading apparatus, made as a mobile unit and comprising a main base structure supported upon wheels by which the apparatus is propelled and guided in its travel between places of use, and upon which base structure is an engine, a mast and a swinging boom, together with the usual cables and cable winding drums as required for use of the machine in the yarding and loading of logs.

The present application is a divisional part of my earlier application filed on July 2, 1951, under Serial No. 234,735, now Patent No. 2,745,559.

It is the principal object of this invention to provide a machine of the character above stated, adapted for the handling of exceedingly large and heavy logs; wherein the boom has a swivel mounting at its lower end on the base structure, and is suspended from the mast at its outer end, to swing in a horizontal arc for yarding and loading from either side; and wherein the main frame is equipped with practical and readily available outrigger jacks whereby the weight, strains and stresses of loads as handled by the boom will be transmitted through the mast and boom directly to the ground and not required to be sustained through the wheels, springs or frame structure of the vehicle's under carriage.

Further objects of the invention reside in the combination, in a machine of the present character, of a mast, a boom mounted on a swivel mounting and suspended at its swinging end from the mast, and in the provision of means for making adjustments in inclination of the mast as required to center the load as applied to the mast, directly over the line of the outrigger jacks.

Still further objects of the invention reside in the details of construction and combination of the various parts, and in the mode of use of the apparatus, as will hereinafter be fully described.

In accomplishing these and other objects of the invention, I have provided the improved details of construction, the preferred forms of which are illustrated in the accompanying drawings, wherein:

Fig. 3 is a side view of a part of the vehicle, with parts broken away for better showing of gearing.

Fig. 4 is a somewhat enlarged cross-section taken on the line 4—4 in Fig. 3, showing the supporting jacks.

Fig. 5 is a plan view, partly in section, of parts of the power transmission mechanism for the drive wheels of the vehicle.

Fig. 6 is a plan and partial sectional view of a part of the power transmission gearing for the yarder mechanism.

Fig. 7 is a vertical section taken on line 7—7 in Fig. 6.

Fig. 10 is an enlarged vertical section taken on line 10—10 in Fig. 8.

Figs. 11, 12 and 13 are views diagrammatically showing operation and use of the machine for log yarding and loading.

Fig. 14 is a diagram of the jack control system.

Fig. 15 is a view showing the gearing as seen when looking through the plane of line 15—15 in Fig. 10.

Referring more in detail to the drawings:

Considered in its entirety, the present unit comprises an under carriage equipped with supporting and steering wheels; a main frame which rests upon and is bolted to the under carriage; a mast that is adjustably mounted by a transverse hinge axis on the main frame, a turn table that is rotatably mounted on the main frame; a boom hingedly mounted on the turntable and supported at its outer end by a connection with the upper end portion of the mast; various cable winding drums with their cables and controls, and an engine; all of which parts are assembled as a compact, mobile and unitary apparatus, suitable for travel over highways and on logging roads, and designed for the expeditious yarding and loading of logs.

Figure 1:
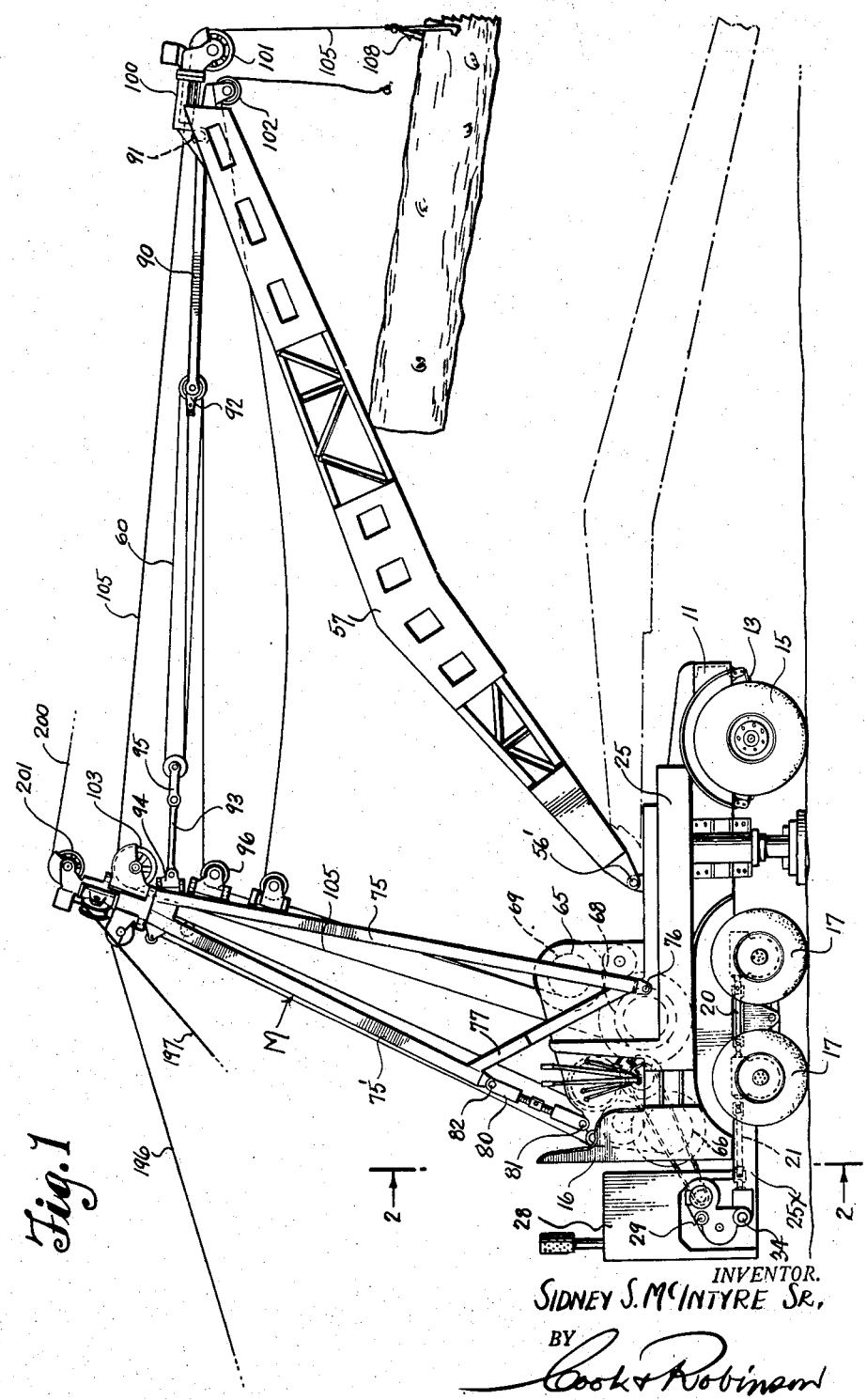
Fig. 1 is a side view of a log yarding and loading vehicle, embodied by the present invention.

In Fig. 1, the apparatus has been shown as set up for a log loading operation, and it will be noted therein that the weight sustaining jacks, mounted on the frame as presently explained, have been functionally extended to sustain the boom loads as applied to the structure. When the unit is to be moved to a new location, the jacks are retracted. To adapt the unit for travel on highways, it is most practical that the boom be lowered and removed from the unit for transportation by other means, and that the mast be lowered to a horizontal position, extending across the forward end of the vehicle, thus to place weight on the steering axle and eliminate tendency of lateral tipping.

The under carriage of the unit as here shown, comprises a rectangular and horizontally disposed frame structure, having opposite side beams 10—10, of built-up L sections, joined at their forward ends by a cross beam 11. This frame structure is resiliently supported at its forward end by leaf springs 13, mounted by a cross axle 14, which at its opposite ends, mounts a set of steering and supporting wheels 15—15. The mechanism employed for steering these wheels is not herein shown, but it may be operated from the driver's position on the vehicle, indicated by the location of the seat 16, in Fig. 1, and for purpose of this description the wheels 15 and steering gear can be considered to be like those parts used in motor trucks and similar automotive vehicles for vehicle steering purposes.

At its rearward end, the frame structure of the under carriage is supported by four sets of ground wheels 17, mounted by tandem axle housings 18—18. At their opposite ends, the axle housings mount springs 19 thereon which, in the usual way, support that end of the under carriage. The paired traction wheels 17 at the opposite ends of the axle housing, are driven through the conventional differential gearing, not herein shown. The differential gearing for the forward set of tandem wheels is driven from and in unison with that of the rearward set through a connection made by a shaft 20 through universal couplings 20x. A drive shaft 21, extends to the shaft 20 from a power take-off shaft 22, as seen in Fig. 5 which is driven by means presently described. Universal couplings 21x connect the ends of shaft 21 with shafts 20 and 22.

Disposed upon and secured to the opposite side beams of the under carriage is the main frame structure of the yarder. This is designed as a rigid unit and carries thereon the conventional cable winding drums. This frame structure also mounts, at its forward end, a turntable upon which the log handling boom is hingedly attached. It also mounts the mast from which the outer end of the boom is adjustably suspended.

The main frame structure of the yarder, which is designated generally by reference character 25 in Figs. 1 and 3, is shown to extend from near the forward end of the vehicle to a point rearward of the rear sets of tandem wheels. At its rear end, the under carriage terminates in transversely spaced, rearwardly extended horizontal arms or brackets, 25x, on which two spaced cross beams 26—26 are fixed. Mounted on these cross beams is the prime mover or engine, designated in its entirety by numeral 28, from which power is derived for the driving of the various cable winding drums; for driving the vehicle wheels which propel the vehicle and for the turning of the turntable.

The engine 28 is so disposed that its drive shaft 29 extends transversely of the main frame. On one end of shaft 29, a small pinion gear 31 is keyed as observed in Figs. 3 and 6. Gear 31 meshes with an idler gear 32 which, in turn, drives a gear 33 fixed on a power transmission shaft 34. The shaft 34 is below and parallel to the engine shaft, and it extends to the central longitudinal plane of the vehicle and is there connected through a reversing gearing shown in Fig. 5, with the drive shaft 22.

The reversing gear is contained within a housing 36 and comprises a pair of opposedly related bevel gears 37 and 37' revoluble on a shaft 38. The gears 37—37' mesh with a bevel gear 39 that is fixed on shaft 22. A clutch sleeve 40 is splined on the shaft 38 between the gears 37—37'. It has clutch teeth 40' at its ends and is shiftable selectively into contact with clutch teeth on the hubs of gears 37 and 37' to obtain forward or reverse driving of the shaft 22, through which the moving power is transmitted to the ground wheels 17—17. A conventional shifting means is shown at 42 in Fig. 5 for shifting the clutch sleeve 40 and it is anticipated that this be controlled from the driver's position. Shaft 34, as observed in Fig. 5, is connected to shaft 38 through flexible couplings as indicated at 43—43.

It is shown in Figs. 3 and 6, that a power transmission shaft 46 is associated with the engine shaft. It is parallel thereto and is equipped at one end with a driving gear 47. At its other end, shaft 46 is equipped with sprocket wheels 48 for the reception of sprocket chain belts for the driving of the cable winding drums of the yarder, as will presently be described.

The gear wheel 47, as seen in Fig. 6 is revoluble on the hub portion 45' of a gear 45 that is splined on shaft 46. Formed integral with the hub of gear 47 is a clutch gear 49 of the same diameter as gear 45, and an internally toothed clutch collar 50 is shiftable on gear 45 into mesh with gear 49 to effect a driving connection between gear 47 and shaft 46. In Fig. 7, a conventional clutch shifting means is shown at 51 and it is anticipated that it be operable from the driver's position on the vehicle, to shift clutch collar 50.

The forward end portion of the main frame structure provides a horizontal base 52 upon which a relatively large gear wheel 53 is rotatably mounted by a vertical pivot shaft 54. The gear is fixed to the pivot shaft and the latter is revolubly mounted in bearings 55—55' in the frame structure, as shown in Fig. 4. The pin extends above the gear 53 and has a cross arm 56 fixed to it. At the opposite ends of the cross arm are trunnions 56'—56' on which the lower end bearings of a boom 57 are pivotally mounted for the support and swinging of the boom.

The boom 57 is preferably of truss-like construction, of a design suitable for the intended handling of heavy logs thereby, and is adapted to be suspended at its outer end from the mast, and to be raised and lowered through the adjustment of a topping line 60 that is included in the connection and is applied and used in a manner presently explained.

The swinging of the boom 57 through a permitted horizontal operating arc, is effected by the turning of the turntable gear wheel 53, and this turning is accomplished through the mediacy of a pinion gear 61 that is mounted in operative mesh with gear 53 to rotate about the upper end of a vertical shaft 62. Shaft 62 is shown in Fig. 10 to be rigidly fixed in a housing 63 fixed in the frame structure. The driving and holding of gear 61 will presently be described.

The yarder mechanism, as embodied by the various cable winding drums and their cables, is mounted on that portion of the main frame of the unit that is between the turntable and engine. The frame structure of the yarder comprises opposite side frames 65—65, rigidly joined, and between which four cable winding drums are mounted on parallel axes for the controlled winding in or unwinding of cables therefrom. The four drums are designated by numerals 66, 67, 68 and 69 and they are mounted respectively, by cross shafts 66', 67', 68', and 69'. The present yarder mechanism, embodied by the various drums, their cables and controls, is not new per se, and therefore will not be described except to the extent required for a proper understanding of the operations of the various parts thereof.

Figure 2:
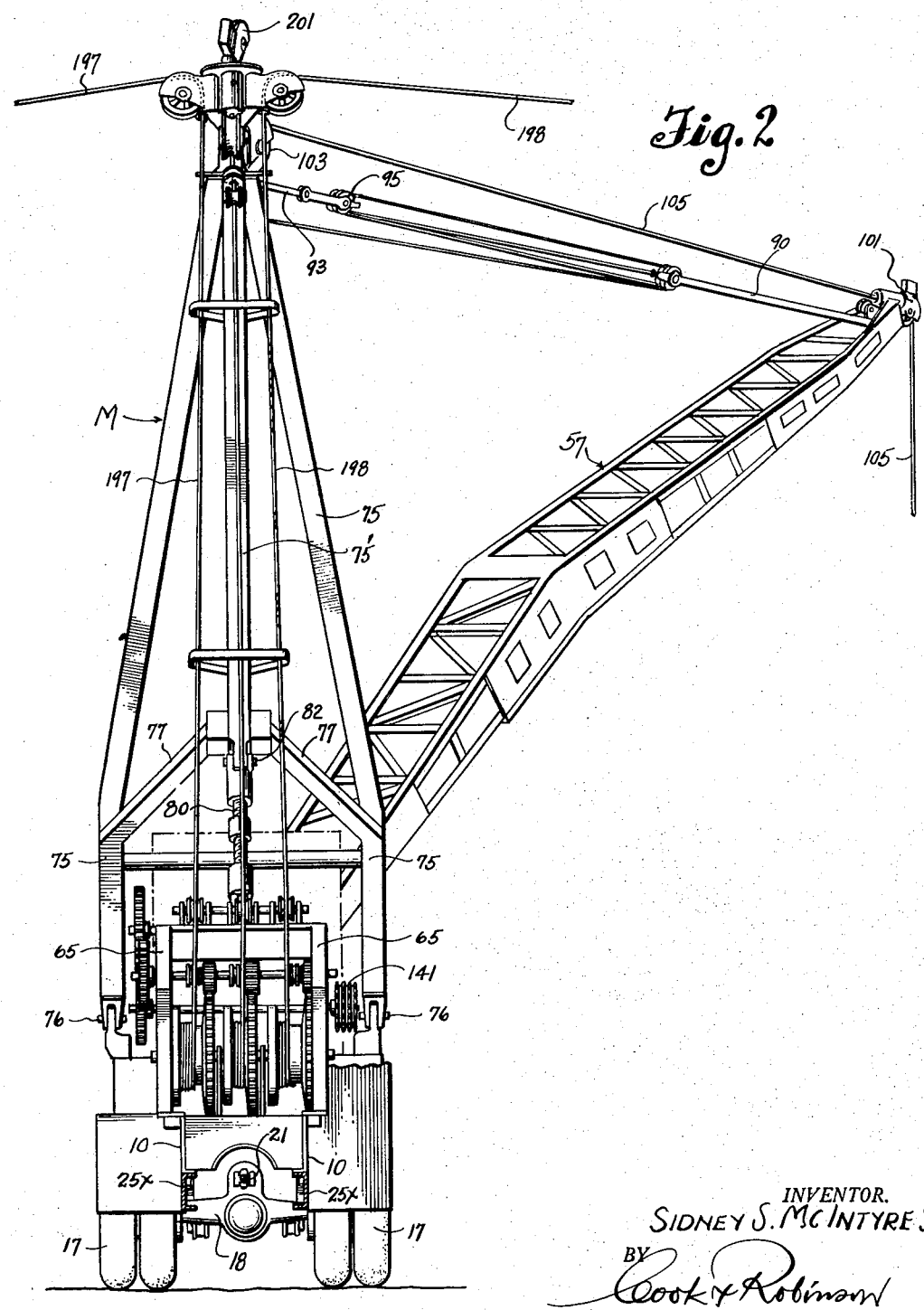
Fig. 2 is a cross-section of the vehicle taken on the line 2—2 in Fig. 1.

Supported upon the yarder frame by the opposite side members thereof, is the mast structure that comprises an essential element of the present combination. This structure is designated in its entirety by reference character M and it is of tripod form of construction. Two of its legs 75—75 are designated as the opposite side legs, and they are downwardly diverged, and pivotally mounted at their lower ends on the opposite side members of the base frame of the yarder, as at 76, in Figs. 1 and 2. The third leg 75' is shorter than the other two and is rearwardly directed, in the medial plane of the vehicle, and at its lower end is joined with the lower end portions of the side legs by means of lateral brace 77. At their upper ends all legs are secured rigidly to a casting 78. The mast is held in functional position, and is adapted to be adjustably inclined to some extent in a forwardly leaning position by means of a turnbuckle 80 that is pivotally connected at its lower end by a bolt 81, to the yarder frame, and at its upper end is pivotally secured by bolt 82, to the lower end of leg 75', as shown best in Fig. 1.

The outer end of the boom is adjustably suspended from the upper end portion of the mast by means including a link 90. This link is pivotally attached at its outer end to the boom as at 91 and at its inner end the link mounts a sheave 92. Likewise, a link 93 is attached by a swivel block 94 to the upper end of the mast, and at its other end the link mounts a sheave wheel 95. The topping line 60, previously mentioned, is dead ended on the inner end of link 90 and extends therefrom about the sheaves 95 and 92, thence back and over a swivel sheave 96 on the mast and down the mast to the cable winding drum 69. By the paying out or drawing in on this line, the boom can be raised or lowered accordingly, and held at a definite elevation by the holding of the drum 69 against turning.

Mounted by the casting 100 at the outer end of the boom, are swivel sheaves 101 and 102, one disposed above and beyond the other. In a loading operation, a loading line, or cable 105 is extended from drum 68, upwardly along the mast, over a sheave wheel 103 that is mounted for swiveling action on the mast just above the swivel connection 94 of link 93 therewith, thence to the outer end of the boom over sheave 101, thence downwardly; this cable being equipped at its end with tongs as at 108, or other suitable means for application to a log for lifting it.

When the device is set up for a loading operation, as shown in Fig. 1, adjustment of the mast is so made that the swivel axis of part 94 to which link 93 is connected, will be slightly forward of a vertical line from the center of the turntable. Also, the mast can, by lateral tilting of the base frame structure, be off-set to one side or the other of the turning axis of the boom, to cause an automatic swinging of the loaded boom to a position of rest at the side toward which the mast is laterally offset.

In view of the exceedingly heavy loads to be handled by the present apparatus, both when used as a yarder and as a loader, I have provided means for relieving the under carriage of a material part of the load that otherwise would be required to be sustained by the springs, wheels and axles.

It is shown in Figs. 1 and 3, that hydraulic cylinders 109—109 are fixed vertically to the opposite side frames of the main frame structure just slightly in advance of the center of the turntable. Pistons 110 are mounted reciprocally therein and have rods extended from the lower ends of the cylinders for support upon bearings, as shown in Fig. 4, provided upon opposite end portions of a heavy cross beam 111 that is firmly seated against the ground, transversely of the frame and between the forward and rearward sets of wheels. By an application of hydraulic pressure medium to the upper ends of these cylinders, the piston rods may be extended as may be required to relieve the vehicle springs, axles, frame and wheels of that weight, strain and stress that they would otherwise be subjected to.

The hydraulic system for actuation of the jacks may be a conventional type of mechanism. In the present instance, a system as shown diagrammatically in Fig. 14 is employed. In this diagram a source of supply of hydraulic pressure medium, in the form of a tank is designated by numeral 210. The intake side of a pump 211 is connected to the supply tank by a pipe 112. A pipe 113 leads from the discharge side of the pump to a four way valve 115. The valve has pipes 116 and 117 connected, respectively, with pipes 118 and 119 which, respectively connect the upper and lower ends of the cylinders. A return pipe 120 leads from valve 115 to the tank, and there also is a by-pass pipe 121 from pipe 113 to pipe 120 including a spring loaded relief valve 122.

By manipulation of the valve 115, the pressure medium can be directed either to the upper or lower ends of the cylinders, or can be held.

It is to be observed that the lower ends of the piston rods connect with the cross beam 11 through pivot bearings 130 of ball and socket form so as to permit necessary leveling up. The piping system between cylinders permits of an automatic equalization of pressures.

The driving of the yarder drums is through connection with the engine, as shown best in Figs. 3 and 6. The yarder is equipped with a transverse drive shaft 140 extended between the side frames 65—65 and to the side of the yarder and this drive shaft has a gear train connection with the various drums. On one end of shaft 140 are sprocket wheels 141 aligned with the sprocket wheels 48 on the driven shaft 46, and chain belts 142 are extended about these sprocket wheels to effect the driving connection. Control of the drums is through the use of conventional controls not herein shown as they form no part of this invention.

The gear train of the yarder includes a gear wheel 145 on the cross shaft 68' as seen in Fig. 3. Gear 145 is in operative mesh with a smaller gear wheel 147 that is fixed on a transversely directed shaft 148 mounted in the frame structure. Also fixed on shaft 148 is a small sprocket wheel 149 as seen in Fig. 3.

Figure 8:
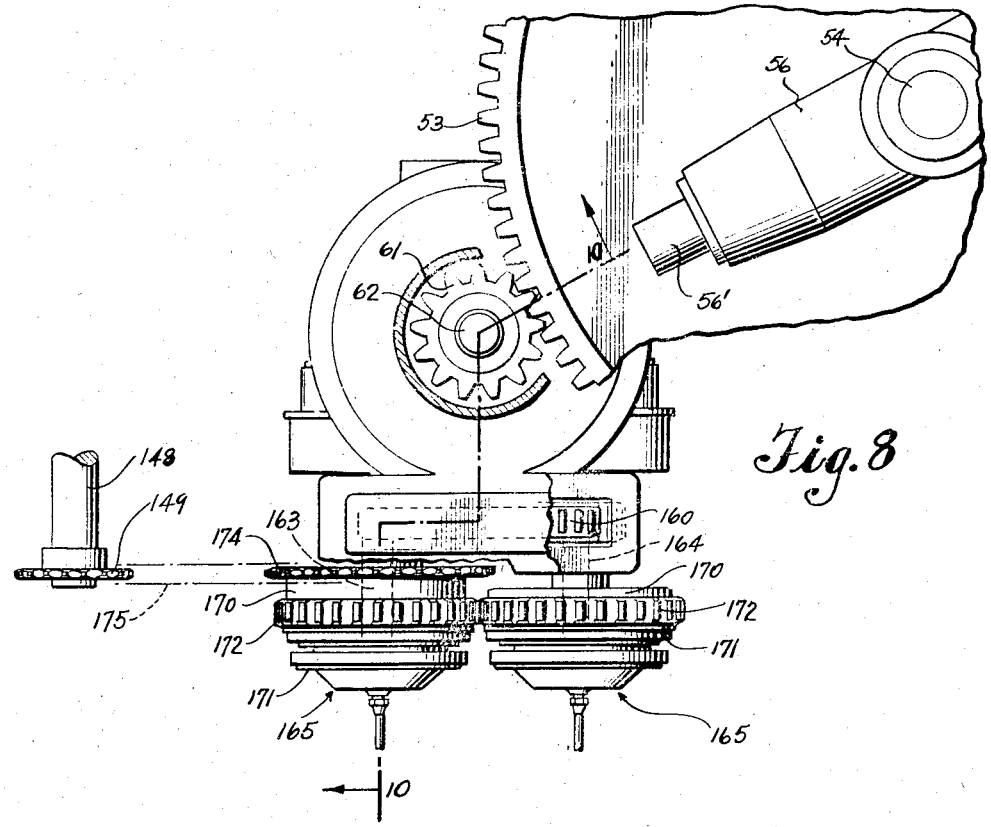
Fig. 8 is a plan and sectional detail of the turntable rotating gears and clutch devices.

The power transmission connections between the turntable driving gear 61 and the sprocket 149 provide for the turning of gear 61 in either direction and the holding of the gear 53 at any set position. These connections are shown in Figs. 3, 8 and 10, and comprise the following parts:

It is shown in Fig. 10 that gear 61 is formed at the upper end of a sleeve 152 that is revoluble on shaft 62. On the lower end of the sleeve 152 is a bevel gear 155 that meshes with a bevel gear pinion 156 revoluble on a supporting shaft 158 that is horizontally disposed, and extends transversely of the machine, directly below shaft 62; being contained in housing 63.

Fixed on the hub portion of the gear 156 is a gear wheel 160. This gear meshes with two gear pinions 161 and 162 keyed on supporting shafts 163 and 164, that are parallel with shaft 158 and disposed in a horizontal plane below it as in Fig. 15.

Associated with each shaft 163 and 164 at its outer end, is a driving clutch mechanism 165, and at the inner end of each shaft is a brake mechanism 166; one of these shafts, as equipped with clutch and brake has been shown in Fig. 10 and the description of parts there shown will apply equally to both.

Each clutch comprises a drum 170 that is revoluble on the mounting shaft, and a clutch disk 171 slidably keyed on the shaft and adapted to be frictionally engaged with and disengaged from the drum to effect and release the driving connection between drum and its shaft.

Formed about each of the drums, is a band of gear teeth 172. The teeth of the two drums are intermeshing to provide a driving connection between the drums. The drum 170 also is formed with an encircling band of sprocket teeth 174 and a chain belt 175 operates about the sprocket wheel 149 on shaft 148 and these teeth 174 to provide a driving connection between shaft 148 and the drums. When a clutch 171 is engaged with the corresponding drum, the mounting shaft for the drum is revolubly driven, and this, through the gear train shown in Fig. 10, causes the turn table to be rotatably moved. The direction of turning of the turntable is controlled by selectively engaging and releasing the clutches.

Figure 9:
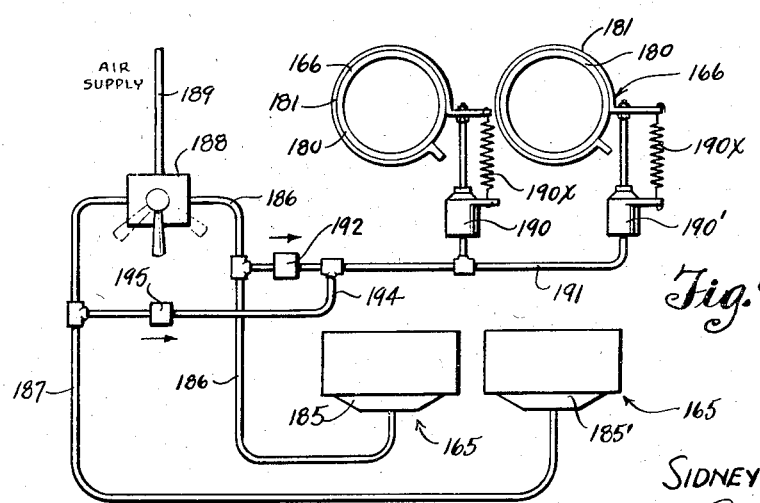
Fig. 9 is a diagrammatic illustration of the air operated brake and clutch controls associated with the turntable.

On the inner end of each shaft 163 and 164, are brake drums 180 to which brake bands 181 are fitted. The brake and clutch as applied to each shaft, are operated in such manner that as the clutch is released, the brake will be applied. Also, when the clutch is applied the brake is released. The control system for the clutches and brakes is shown in Fig. 9, as comprising the following parts.

Associated with the two clutches are air drums 185—185', connected by pipe lines 186—187 with opposite sides of a control valve 188 to which a source of air under pressure is connected by a pipe line 189. Also, associated with the brakes, 166—166, are air cylinders 190—190', connected by a pipe line 191 to pipe 186 through a check valve 192. Also, a pipe 194 connects pipe 186 through a check valve 192. Also, a pipe 194 connects pipe 191 with pipe 187 and a check valve 185 is interposed in pipe 194. By hand manipulation of control valve 188, air can be directed into either clutch drum 185 or 185'; thus to selectively engage the clutches as required for turning the turntable in one or the other direction, for moving the boom to a desired position. When air is turned into either drum to release a clutch, the brakes are simultaneously released by the admittance of air to the brake cylinders 190—190', thus to permit the turning of the clutch shafts. However, upon turning the valve 188 back to a neutral position, the brakes will be set and both clutches disengaged. Setting of the brakes is by reason of springs 190x attached under tension to the brake bands as indicated in Fig. 9.

Assuming the machine to be so constructed, it will be understood that through the mediacy of the engine 28 and wheels 17 it can be propelled along a highway or road. For short distance movement, it is practical to leave the mast in erected position and the boom suspended therefrom. However, for long distance travel, it is advisable to detach the boom for transportation on a separate vehicle and to lower the mast across the front end of the vehicle.

To set up the device for a log yarding operation, the vehicle is moved to the desired location, and the jacks 109 extended, as in Fig. 4, to take the weight off the wheels 15 and 17 and give the vehicle the desired support and rigidity. The mast is then erected and the guy lines extended therefrom and secured at points most advantageous for the job being done. For proper guying of the mast, I employ three guy lines. These have been shown best in Figs. 11, 12 and 13 wherein the direction of their extension from the mast has been determined by the direction from which the logs are to be yarded. The three lines are designated at 196, 197 and 198. These lines are extended over swivel sheaves at the upper end of the mast to the anchor members which might be trees, stumps or posts. The inner ends of the guy lines may be wound on drums operable to draw the lines taut and to secure the mast, the drums being associated with the yarder.

By the proper tensioning of these guy lines, practically all weight of equipment and boom load can be caused to be sustained by the jacks because of the relative rigidity of the mast and frame structure to which the jacks are attached and because the guyed upper end of the mast is substantially directly over the transverse line of the jacks.

A sky line 200 is extended over a sheave 200 at the upper end of the mast to a spar tree for the handling of logs in the usual way. This is shown in part in Fig. 1.

After yarding has been completed, the boom is adjusted to position of support as has been shown in Fig. 1, and used in the usual way for loading purposes. The position of elevation of the boom is controlled by the topping line 60. The swinging of the boom is controlled by the turning of wheel 53 and the support of the log is through line 105 and tongs 108.

It will further be explained that in use of the boom 57 for the normal yarding of logs, and assuming it to be set as diagrammatically shown in Fig. 11, or in Fig. 12, a line 202 is run out from over the sheave 102 at the outer end of the boom, at a right angle to direction of the boom and opposite to the direction of the yarding line 105, line 202 would be securely anchored to a stump or other fixed object. This anchor cable is used as it is practically impossible to design the gearing of the turntable to withstand the full and excessive strain of such yarding operations by itself. The three guy lines will take all the mast load and make the unit stable.

For normal loading operations the setting is as shown diagrammatically in Fig. 13. In this operation, line 105 is used as a log lifting line. Then the boom is swung by means of gear 53 to carry the log to the desired unloading position. Line 202 is not normally used in loading operations but may be used as a safety item if necessary.

The arrangement of guy lines and cables may be varied to meet requirements of loading or yarding.

The primary feature of this machine resides in the provision therein for sustaining the weight of the mast load, boom load and most of the vehicle weight on the outrigger jacks through proper guying of the mast. Proper guying provides that the vehicle's frame structure and its wheels, will not be subjected to the excessive strains and stresses which they otherwise would be required to sustain. The vehicle frame and mast are relatively rigid and in effect, the jacked up vehicle and guyed mast becomes a spar tree, and functions as such a tree for the yarding and log loading operations.

Having thus described my invention, what I claim as new therein and desire to secure by Letters Patent is:

1. A log yarding and load vehicle comprising a rigid frame structure equipped with wheels or the like, log handling means mounted on the vehicle, said log handling means including a mast rigidly fixed to the frame structure, a boom hinged and pivotally mounted at its inner end on the frame structure, a suspending connection between the outer end of the boom and the upper end of said mast, means for guying and positioning the upper end of the mast, a pair of aligned, operatively interconnected, double acting, hydraulic jacks fixed to the frame structure at opposite sides thereof and intermediate its ends, each of said jacks including a cylinder and a downwardly extendible piston, a cross beam interconnecting the lower ends of said pistons and adapted to engage the ground, an unobstructed fluid pressure line extending between the upper ends of the jacks, and an unobstructed fluid pressure line extending between the lower ends of the jacks. whereby the pressure on the jacks is constantly equalized and the weight of the frame structure and log handling means is supported by the jacks and removed from the wheels.

2. A log yarding and loading vehicle as recited in claim 1 wherein the jack cylinders are rigidly fixed to the frame structure and said cross-beam has bearings mounted thereon at its opposite ends, and said pistons have fixed pivotal connections at their lower ends with said bearings of the cross-beam.

References Cited in the file of this patent
UNITED STATES PATENTS

| | | |
|---|---|---|
| 1,350,992 | Downie | Aug. 24, 1920 |
| 1,840,666 | Grundon | Jan. 12, 1932 |
| 1,906,532 | Buehler et al. | May 2, 1933 |
| 2,025,284 | Huot | Dec. 24, 1935 |
| 2,365,169 | Billings | Dec. 19, 1944 |
| 2,400,803 | Barnhart | May 21, 1946 |
| 2,558,306 | McIntyre | June 26, 1951 |
| 2,564,929 | Shoemaker | Aug. 21, 1951 |
| 2,741,373 | Edgar | Apr. 10, 1956 |
| 2,750,204 | Ohrmann | June 12, 1956 |